United States Patent [19]

Bauer

[11] Patent Number: 5,271,567
[45] Date of Patent: Dec. 21, 1993

[54] FERTILIZER DISTRIBUTION HEAD AND DISPENSING CHUTE

[75] Inventor: Norman A. Bauer, Watertown, Minn.

[73] Assignee: Ag-Chem Equipment Co., Inc., Minnetonka, Minn.

[21] Appl. No.: 935,317

[22] Filed: Aug. 26, 1992

[51] Int. Cl.$^5$ .................... A01C 3/06; A01C 23/02; A01C 5/00
[52] U.S. Cl. .............................. 239/662; 137/561 A; 366/270; 111/123; 111/156
[58] Field of Search ............... 239/172, 175, 222, 263, 239/263.2, 380, 655, 662; 111/120, 123, 156; 222/236, 410; 137/561 A; 415/121.1, 201; 416/200 R; 366/262, 270

[56] References Cited

U.S. PATENT DOCUMENTS

| 200,557 | 2/1878 | Mettler ............... 111/156 X |
|---|---|---|
| 1,348,885 | 8/1920 | Laffoon ............... 222/410 X |
| 2,058,539 | 10/1836 | Welty et al. ............... 111/156 X |
| 2,547,867 | 4/1951 | Judson ............... 222/410 X |
| 2,779,263 | 1/1957 | Franz et al. ............... 111/156 X |
| 3,143,295 | 8/1964 | Booker . | |
| 3,330,070 | 7/1967 | Ferm et al. . | |
| 3,403,397 | 9/1968 | Harrington et al. . | |
| 3,511,411 | 5/1970 | Weiss . | |
| 3,526,467 | 9/1970 | Kime ............... 416/200 R |
| 3,608,645 | 9/1971 | Meiners ............... 111/123 X |
| 3,854,429 | 12/1974 | Blair ............... 111/123 X |
| 3,855,953 | 12/1974 | Fathauer et al. . | |
| 3,945,332 | 3/1976 | Wirsbinski . | |
| 4,014,271 | 3/1977 | Rohlf et al. . | |
| 4,014,271 | 3/1977 | Rohlf et al. ............... 239/662 X |
| 4,116,138 | 9/1978 | McFarland et al. . | |
| 4,162,128 | 7/1979 | Ogden et al. ............... 366/270 X |
| 4,277,022 | 7/1981 | Holdsworth et al. . | |
| 4,350,293 | 9/1982 | Lestradet . | |
| 4,592,294 | 6/1986 | Dietrich, Sr. et al. ............... 111/156 X |
| 4,719,862 | 1/1988 | Edmisson ............... 111/123 |
| 4,723,710 | 2/1988 | Lucore, II . | |
| 4,765,263 | 8/1988 | Wilkins ............... 111/123 X |
| 5,033,397 | 7/1991 | Colburn, Jr. . | |
| 5,170,820 | 12/1992 | Jones ............... 137/561 A X |

FOREIGN PATENT DOCUMENTS

| 322941 | 7/1989 | European Pat. Off. . | |
|---|---|---|---|
| 0430347 | 6/1991 | European Pat. Off. . | |
| 3417372 | 11/1985 | Fed. Rep. of Germany ...... 239/662 |
| 542570 | 8/1922 | France ............... 111/156 |
| 98839 | 3/1940 | Sweden ............... 111/123 |
| 668246 | 3/1952 | United Kingdom ............... 239/175 |
| 754298 | 8/1956 | United Kingdom ............... 111/156 |

Primary Examiner—Andres Kashnikow
Assistant Examiner—William Grant
Attorney, Agent, or Firm—Haugen and Nikolai

[57] ABSTRACT

A liquid manure dispensing apparatus including a distribution head for breaking down larger clumps of liquid manure and uniformly distributing it to earth working members having an integral delivery chute. The distribution head comprises an impeller journaled for rotation in a chamber for preventing blockage by reducing the size of larger clumps of liquid manure between distal ends of integral vanes and the chamber wall. Each unitary earth working member includes an integral shank and liquid manure delivery chute, and it is designed such that the delivery chute forms a portion of the shank and to form a wedge shape. The delivery chute dispenses liquid manure behind the shank in a created furrow, wherein an outlet port of the chute opens downwardly and rearwardly to minimize blockage. The wedge shape of the chute prevents soil from collapsing into the furrow as liquid manure is dispensed to minimize soil blocking the outlet of the chute.

18 Claims, 4 Drawing Sheets

FERTILIZER DISTRIBUTION HEAD AND DISPENSING CHUTE

BACKGROUND OF THE INVENTION

I. Field of the Invention

This invention relates generally to an agricultural liquid manure dispensing system, and more particularly, to a distribution head and an earth working member including an integral delivery chute which form a part of the dispensing system. The distribution head breaks apart larger clumps of liquid manure and dispenses uniform amounts to each of several delivery chutes which dispense the liquid manure in furrows below the surface of the soil.

II. Background of the Invention

To obtain an optimal crop yield, it is important that the farmer ensures the field has sufficient soil fertility prior to and during each growing season. To balance or improve the soil fertility, the farmer usually treats the field with either a natural fertilizer, such as liquid manure, or with commercially available chemicals. Usually, the farmer applies both chemicals and liquid manure to the field depending upon the availability, costs, and to take advantage of the benefits each has to offer.

Man-made chemicals are usually dispensed upon the field by mechanisms having spraying nozzles when the fertilizer is in liquid form, or by well-known spreading mechanisms when the fertilizer is in a granular form. Dispensing and spreading liquid manure, however, is somewhat more difficult to dispense and spread due to its irregular slurry and sludge-like form and consistency. Consequently, liquid manure dispensing mechanisms need to be designed to avoid periodic clogging due to larger clumps of manure becoming jammed in the dispensing passageways. The liquid manure is typically mixed and agitated prior to being loaded into a spreader tank or hopper of a spreader vehicle, such as a tractor, to help reduce subsequent clogging. However, the inherent settling of the manure in the tank can compact the manure such that it has the consistency of sludge with larger clumps. Thus, when the liquid manure is dispensed from the storage tank the liquid manure can subsequently become clogged in distribution valves, distribution passageways, or in flow meters sensing the flow of manure from the tank. An auger or a pump is typically provided in the spreader tank adjacent the outlet to dispense the liquid manure.

Another problem with dispensing liquid manure into the soil is the inherent problem of run-off, odors, flying insect problems, as well as the unsightly appearance of surface spreading manure. Thus, it is desirable to dispense liquid manure into the soil below a soil surface to minimize these inherent problems. Dispensing liquid manure into the soil below the surface of the soil can lead to clogging of the distribution passageways proximate the soil when chunks of soil or clay become lodged within the opening of the passageway. This is a common problem because the dispenser opening needs to be large enough to pass the slurry-form liquid manure yet has to be located proximate the soil in a furrow.

U.S. Pat. No. 3,945,332 to Wirsbinski teaches an apparatus for injecting liquid manure into the soil wherein a pump is used for discharging the material from the storage tank. This device provides a separate dispensing passageway located behind an earth-working chisel tool. However, the T-shaped connection between the hose and the longitudinal passageway can facilitate occasional clogging. Further, this device has no mechanism disposed beyond the outlet from the tank to agitate or reduce the clumps of the liquid manure to help avoid clogging in the subsequent passageways and dispensing tubes. Finally, there is no mechanism ensuring a uniform distribution of liquid manure to the various passageways from the main passageway.

U.S. Pat. No. 4,014,271 to Rohlf, et al., teaches a liquid manure system. This device also fails to teach a device in communication between the tank outlet and the dispensing tubes to reduce the size of clumps of manure or to prevent subsequent clogging in the passageways. Thus, it is possible liquid manure can become clogged in the valve member or the Y-shaped manifold coupling the liquid manure to the various passageways.

U.S. Pat. No. 5,033,397 to Colburn, Jr., teaches a chemical dispensing system for injecting chemicals below the surface of the soil. This system is adapted to dispense liquid chemicals out lateral ports defined in the sides of each shank. A protrusion is defined forward of each of the orifices to help prevent clogging. However, this arrangement is not suitable for dispensing liquid manure which has the consistency of a sludge or slurry. Since this system is adapted for liquid fertilizer, it is not necessary to provide a mechanism for breaking apart larger clumps of liquid manure.

European Patent Application 0,430,347 teaches a turf layer manuring device. This device includes a distributor for distributing manure to a plurality of outflow hoses. This application fails to teach a mechanism for reducing the size of the clumps, but rather, only teaches an arrangement for reversing the direction of flow in the distributor to eliminate clogging after clogging has been sensed. Thus, the mechanism provides a solution after a clogged condition rather than preventing clogging in the first place.

OBJECTS

It is accordingly a principal object of the present invention to provide a liquid manure distribution head which receives liquid manure from a storage tank and which breaks apart larger clumps of liquid manure prior to subsequent distribution to the dispensing heads.

It is another object of the present invention to provide a liquid manure distribution head which can evenly distribute liquid manure to a plurality of distribution lines after breaking down the clumps of manure.

It is a further object of the present invention to provide a liquid manure distribution head which prevents clogging of liquid manure in distribution lines rather than eliminating clogging after the fact.

It is yet another object of the present invention to provide a distribution head which is hydraulically powered by the application vehicle.

It is yet a further object of the present invention to provide a dispensing member for dispensing liquid manure below the surface of the soil.

It is yet another object of the present invention to provide a liquid manure dispensing member which is not subject to clogging by either the liquid manure or the soil when operated below the surface of the soil.

It is still yet another further object of the present invention to provide a dispensing member which reduces the size of the clumps of liquid manure adjacent the soil.

Other objects, features and advantages of the present invention will become apparent to those skilled in the art through the Description of the Preferred Embodiment, claims, and drawings herein wherein like numerals refer to like elements.

DESCRIPTION OF THE PREFERRED EMBODIMENT

Figure 1:
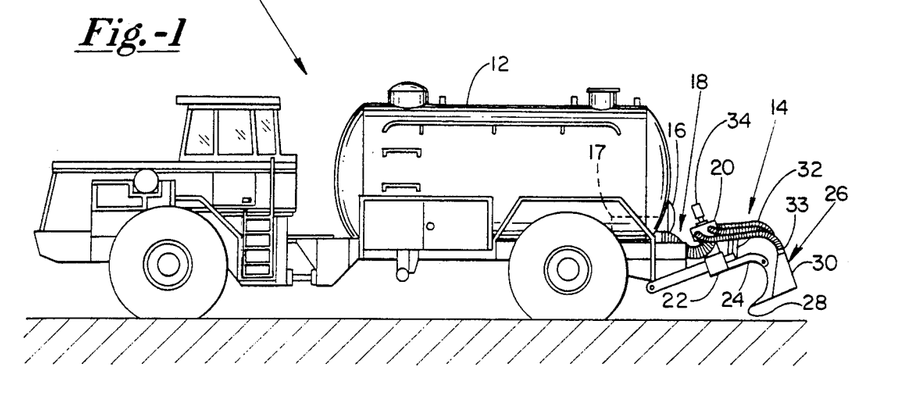
FIG. 1 is an elevation view of a typical application vehicle including a distribution head and a plurality of dispensing members each having a dispensing passageway integral to the shank of the earth working tool.

Referring to FIG. 1, a typical farm distribution vehicle is generally shown at 10. Vehicle 10, which is shown as a truck, but could comprise of a tractor or other suitable vehicle, includes a rear storage tank 12 for storing liquid manure. Vehicle 10 includes a liquid manure distribution apparatus generally shown at 14 which is pivotally attached to a rear portion of the vehicle frame via a standard 3-point hitch or other suitable attaching arrangement. Distribution system 14 distributes liquid manure from tank 12 about a field as vehicle 10 traverses the field. In normal operation, distribution system 14 is lowered toward the ground while the vehicle is in motion such that the earth working members penetrate the soil prior to initiating distribution of liquid manure. As vehicle 10 traverses the field, the working members dig furrows in the soil wherein liquid manure is subsequently dispensed into these furrows at an elevation below grade. Liquid manure is typically dispensed from tank 12 by a dispenser 17, such as an internal auger, a pressure vacuum pump, or a fixed displacement pump, each of which advances the liquid manure to an output port 16 located at a lower and rearward portion of tank 12. Dispenser 17 dispenses manure proportional to and at a rate dependent upon the sensed ground speed of vehicle 10 (See FIG. 9) as will be described shortly. Distribution system 14 communicates liquid manure dispensed by dispenser 17 from output port 16 to distribution chutes and spreads the liquid manure about the field in the created furrows as will now be described in considerable detail.

Referring still to FIG. 1, distribution system 14 comprises a flexible main discharge hose or conduit 18 sealingly adapted to output port 16 of tank 12 for communicating liquid manure from tank 12 to a distribution head 20. Distribution head 20 is fixedly mounted upon a central portion of a tool bar 22 which is pivotally connected to the frame of vehicle 10 in a 3-point hitch arrangement as previously discussed. A plurality of uniformly spaced unitary soil working members 26 extend downwardly from tool bar 22 and each include a shank with a sharpened tip 28 and an integral delivery chute 30 as shown. Subsequently, as tool bar 22 is raised or lowered to correspondingly raise or lower each of the soil working members 26, distribution head 20, which is mounted thereon, is raised or lowered therewith.

Distribution head 20 comprises a cylindrical housing defining a chamber therewithin having an impeller journaled for rotation therein as will be described shortly. A plurality of output ports are defined through an outer wall of the housing of distribution head 20 in communication with the chamber. A flexible distribution passageway 32 is coupled to each output port for communicating liquid manure from the chamber defined within distribution head 20 to a corresponding discharge chute 30 as will be described shortly. The impeller of distribution head 20 is driven by a hydraulic motor 34 which is securely coupled to an impeller shaft extending external the housing. Hydraulic motor 34 is coupled to and driven by hydraulic lines extending from a hydraulic pump which, in turn, is mechanically coupled to the drive shaft of the vehicle (not shown). Driving a hydraulic motor from a rotating drive shaft of a farm vehicle is well known in the art.

Distribution head 20 communicates and breaks up larger clumps of liquid manure from the main discharge hose 18 to each of the distribution lines 32 to prevent clogging. In use, tool bar 22 is lowered towards the earth such that each of the soil working members 26 penetrate the soil and dig a respective furrow in the earth as vehicle 10 traverses the ground. When a valve of tank 12 (not shown) is opened to communicate liquid manure from tank 12 via output port 16 to main discharge hose 18, distribution head 20 breaks up clumps of liquid manure, and subsequently evenly distributes the liquid manure to each of the distribution lines 32. Each of the distribution lines 32 subsequently communicate the liquid manure to individual and respective delivery chutes 30, which are integral to the earth working member 26. Chutes 30 dispense the liquid manure behind each soil working member 26 into the generated furrow as will be described shortly.

Figures 2, 3:
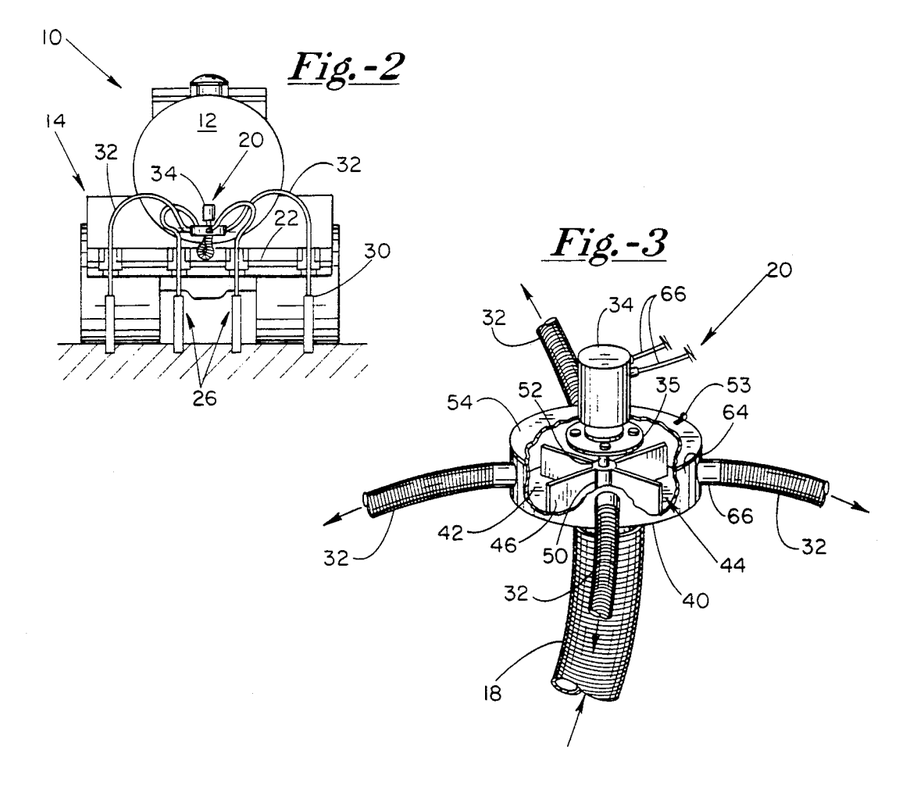
FIG. 2 is a rear view of the vehicle illustrating the distribution head communicating liquid manure from the storage tank to a plurality of distribution passageways.
FIG. 3 is a partially sectioned perspective view of the distribution head which reduces the size of the clumps of liquid manure while evenly distributing liquid manure to a plurality of passageways.

Referring to FIG. 2, a rear view of vehicle 10 is shown including liquid manure distribution system 14 adapted to laterally extending tool bar 22. Again, tool bar 22 is pivotally adapted to the frame of vehicle 10 via a standard 3-point hitch arrangement or other similar attachment means. Distribution head 20 is fixedly attached upon a center portion of tool bar 22. Each of earth working tools 26 are uniformly spaced from one another along the length of tool bar 22. Hence, when tool bar 22 is lowered to the earth via a hydraulic unit (not shown), as vehicle 10 traverses the field, a plurality of uniformly spaced furrows will be dug in the soil by each respective earth working tool 26. Liquid manure is communicated from tank 12 via distribution head 20 to each of the respective distribution lines 32 and subsequently to each of the respective distribution delivery chutes 30 for dispensing into each of the furrows as previously described.

Referring now to FIG. 3, distribution head 20 is illustrated and will be discussed in detail. Distribution head 20 comprises a cylindrical housing 40 defining a chamber 42 therein. An impeller 44 is concentrically journaled for rotation within chamber 42 and comprises a plurality of equally spaced radially extending vane members 46. Each vane member 46 comprises a rectangular plate extending radially outward from a center hub portion 50 of impeller 44 wherein hub 50 is concentrically arranged within chamber 42. Each vane 46 is of substantially equal length and extends to a distal end proximate an inner wall of housing 40 but is sufficiently spaced therefrom to allow passage of smaller particles (See FIG. 5). A shaft 52 forms an integral portion of impeller 44 and vertically extends from chamber 42 through housing 40. Shaft 52 is concentric with and extends perpendicularly through the center of an upper circular wall 54. Upper wall 54 is hingingly attached to an outer wall 64 via a hinge 53 and which forms a portion of housing 40, as will be described shortly. Shaft 52 is rotatably driven by motor 34. Motor 34 is securingly attached to upper wall 54 via a bolt arrangement and adapter 35 in a concentric arrangement. A pair of hydraulic lines 60 communicate hydraulic fluid (not shown) to and from hydraulic motor 34 to drive motor 34. Hydraulic lines 60 are coupled to a hydraulic pump (not shown), which pump is mechanically driven by the drive shaft of vehicle 10.

A plurality of output ports 47 having identical diameters are defined through an outer wall 64 of housing 40. A nipple 66 is sealingly adapted to each of the ports 47 to communicate liquid manure residing within chamber 42 to each of the respective distribution passageways 32. Each distribution passageway 32 has an identical diameter and is corrugated and flexible. Each passageway 32 is sealingly coupled to a respective nipple 66 to communicate liquid manure to each of the distribution chutes 30 as previously described. One principal feature of the present invention is that each vane 46 lies in a plane parallel to shaft 52. Thus, vanes 46 are not angled with respect to shaft 52. Hence, distribution head 20 does not operate as a pump, but rather serves to break apart and liquify the sludge-like or slurry of liquid manure being communicated from main hose 18 to each of the distribution lines 32.

Impeller 44 is rotatably driven at a sufficient and selectable speed by motor 34 which has sufficient power to break apart most larger clumps of liquid manure. Each vane 46 extends to proximate an inner wall of housing 40, but is closely spaced therefrom to allow smaller clumps of liquid manure to pass between vane 46 and inner wall 70 of housing 40 while breaking apart larger clumps therebetween as impeller 44 is rotated. The liquid manure within hose 18 is under sufficient pressure due to dispenser 17 defined within tank 12, as previously described, or simply due to gravity acting upon the large quantity of liquid manure in tank 12. Hence, the pressure on the liquid manure in hose 18 is sufficient to urge liquid manure out of each of the equally spaced ports 47, nipples 66 and into flexible distribution lines 32.

Each opening 47 defined in the outer wall 64 of housing 40 is of equal diameter and is equally spaced in the arcuate direction from one another such that substantially equal quantities of liquid manure is dispensed out chamber 42 into each distribution line 32. Further, there are an equal number of vanes 46 as there are ports 47 and distribution passageways 32 which further ensures a uniform distribution of liquid manure from passageway 18 to each of the distribution passageways 32. However, limitation to an equal number of ports 47 and vanes 46 is not to be inferred. Distribution head 20 is axially mounted in a substantially vertical position when tool bar 22 is in the lowered position, as shown in FIG. 2, to help ensure a uniform distribution of liquid manure from hose 18 to each of distribution lines 32. When tool bar 22 is in the raised position, as shown in FIG. 1, distribution head 20 is angled upward slightly which is of no consequence since liquid manure is not being distributed in this position.

Figure 4:
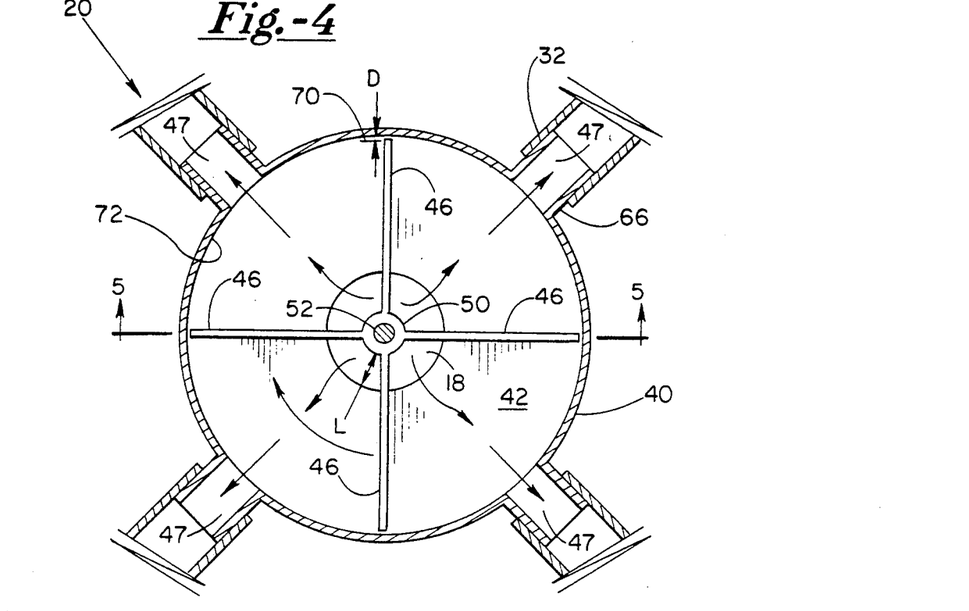
FIG. 4 is a top sectional view of the distribution head illustrating the vertically positioned vanes and the equilaterally spaced delivery tube ports.

Referring to FIG. 4, a top sectional view of distribution head 20, and specifically chamber 42, is shown illustrating the concentric arrangement of hub 50, drive shaft 52, and vanes 46 which are rotatably positioned within chamber 42. Liquid manure enters chamber 42 from main distribution hose 18 below (see also FIG. 5). Larger clumps of manure are broken apart within chamber 42 as they become wedged between the inner walls 72 of housing 40 and the distal ends of vanes 46, shown as dimension D. Clumps are also broken down due to the spacing between an inner wall of main passageway 18 and hub 50 shown as dimension L. Vanes 42 essentially section or partition an opening 76 of hose 18 into chamber 42 into four quadrants. These four openings or quadrants also serve to break apart the larger clumps of manure as they enter chamber 42. The rotation of impeller 44 helps ensure manure does not become jammed within main passageway 18 as it enters chamber 42. Impeller 44 breaks apart the liquid manure as it is rotated wherein the fluid pressure of the liquid manure forces the liquid manure out each of openings 47 and nipples 66 to each of the flexible distribution passageways 32. The arrows indicate the directional flow of liquid manure as it enters chamber 42 from hose 18 and is eventually distributed to each of passageways 32.

Housing 40 is comprised of a rigid steel or aluminum material, as is each vane 46 which comprise impeller 44. However, a rigid plastic material is also suitable, and limitation to a steel or metal material is not to be inferred.

As impeller 44 rotates within housing chamber 42, the distal end of each vane 46 rotates in an arcuate path shown at 70. As shown, each distal end of vane 46 defining path 70 are closely spaced to but separated from an inner wall 72 of housing 40 to create a clearance "D". Larger chunks of liquid manure will subsequently be broken apart as vanes 46 wedge the larger clumps between the distal ends of vanes 46 and inner wall 72. A typical clearance of ¼ of an inch is preferred, however, limitation to this spacing is not to be inferred. As is also shown in FIG. 4, the plane of each vane 46 extends substantially in a vertical direction and is parallel to shaft 52 such that impeller 44 breaks apart the liquid manure regardless of the direction of rotation.

Figure 5:
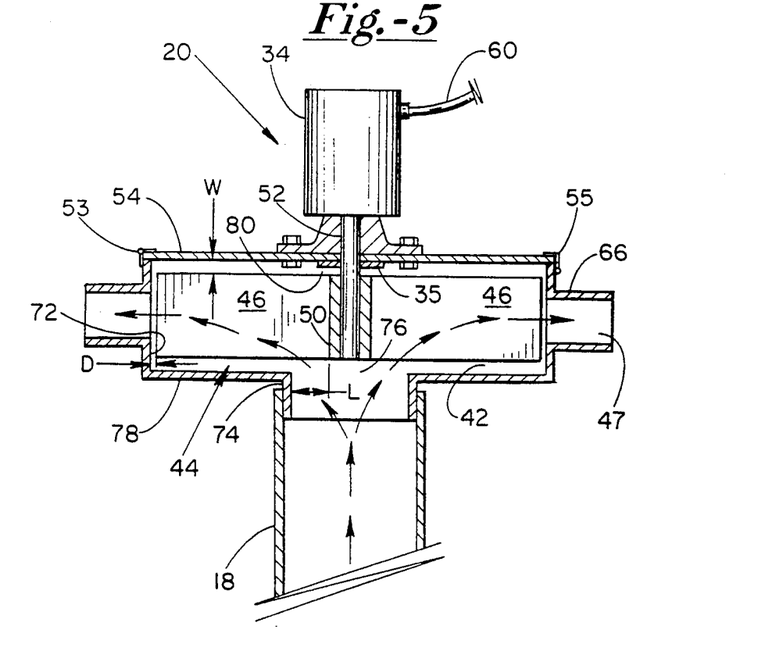
FIG. 5 is a sectional side view 5—5 shown in FIG. 4 of the distribution head illustrating the flow direction of liquid manure from the input port to the plurality of distribution lines, and further illustrates the clearances between various parts.

Referring to FIG. 5, a sectional view 5—5 shown in FIG. 4 is illustrated. FIG. 5 indicates a directional flow of liquid manure as it enters chamber 42 from main distribution hose 18 and which is eventually dispensed out each outlet port 47 as shown. A lower nipple 74 extends about input port 76 which opens downwardly from chamber 42 to communicate liquid manure from main hose 18 into chamber 42. Input port 76 is concentrically defined in a central location of a bottom wall 78 also forming a portion of housing 40 about chamber 42. Also shown in FIG. 5 is a seal 80 which forms a liquid seal about shaft 52 to prevent leakage of liquid manure from chamber 42 exterior of housing 40. A standard seal which comprises gasket material is suitable.

FIG. 5 also illustrates the distance "D" illustrated in FIG. 4 and which represents the spacing between the distal end of each vane 46 and inner wall 72 of housing 40. Also, illustrated in FIG. 5 is clearance "W" defined between an upper edge of each vane 46 and upper wall 54 of housing 40. This clearance "W" is typically about ⅛ of an inch, however, limitation to this clearance is not to be inferred. Clearance "W" is larger than clearance "D" to help break apart larger clumps of liquid manure which are initially too large to be wedged between the distal end of vanes 46 and sidewall 72. Thus, larger clumps of liquid manure will first be broken down between the longitudinal edge of each vane member 46 and upper wall 54, and will then subsequently be broken apart between smaller clearance "D" before being allowed to communicate out each output port 47. Also shown in FIG. 5 is dimension "L" defined between the rim of input port 76 and the lower end of hub 50 of impeller 44. Dimension "L" also reduces the size of clumps of liquid manure as they enter chamber 42. Dimension "L" is equal for all quadrants defined by vanes 46 partitioning the opening from input port 76 into chamber 42. Dimension "L" is less than the diameter of each nipple 66 which encompasses output port 47 in a lateral wall of housing 40. Dimensions "D", "W" and "L" are defined between respective members to break apart the slurry or sludge-like liquid manure as it passes from input hose 18 to output ports 47 and flexible distribution lines 32. Dimension "L" is larger than dimension "W", and dimension "W" is larger than "D".

FIG. 5 further illustrates how top cover 54 is pivotally attached to sidewall 64 via hinge 53, as previously described. Hence, cover 54, along with motor 34 and impeller 44, can be pivoted upwardly with respect to sidewall 64 to facilitate cleaning and accessing chamber 42. A locking device 55 secures cover 54 to housing sidewall 64 when in the closed position.

Figure 6:
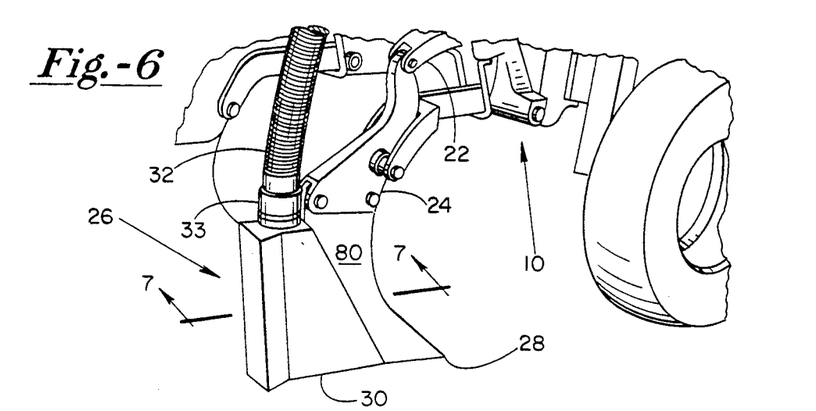
FIG. 6 is a perspective view of a unitary earth working member including an integral shank and distribution passageway disposed behind the shank.

Now referring to FIG. 6, a second embodiment of the present invention is illustrated. FIG. 6 illustrates an enlarged perspective view of one of the plurality of unitary earth working members 26 having an integral plowing member and a dispensing chute. Each of earth working members 26 are pivotally secured to tool bar mount 22 via a shank bracket 24 as shown in FIG. 1. Each of earth working members 26 extend downwardly from bar mount 22 towards the earth and can be selectively lowered to penetrate the earth to create a respective furrow when vehicle 10 is traversed across the field. Each earth working member 26 comprises an integral member formed by a first portion or shank 80 which includes tip 28 facing forwardly toward vehicle 10. Shank 80 has an arcuate leading surface facing inward towards vehicle 10 as shown. Earth working member 26 also includes a second portion or distribution chute 30 as previously discussed. Distribution chute 30 is integral to earth working member 26 and is welded to shank 80 to form a single uniquely designed member as will be discussed shortly (see FIG. 7).

Distribution chute 30 is disposed behind shank 80 for dispensing liquid manure in the furrow created behind shank 80 as vehicle 10 is propelled across the field. This ensures manure is dispensed below grade to reduce unpleasant odor and such that run-off is minimized. Each distribution line 32 extends upwardly from a respective earth working member 26 and communicates liquid manure from tank 10 and distribution head 20 to an upper port of distribution chute 30 via a coupling 33 as shown. Distribution chute 30 has a wedge shaped cross section (see FIG. 8) such that earth working member 26 can glide through the soil to create a furrow with minimal resistance, yet wherein the passageway defined within chute 30 is large enough to allow passage of liquid manure at a significant rate into the furrow.

Figure 7:
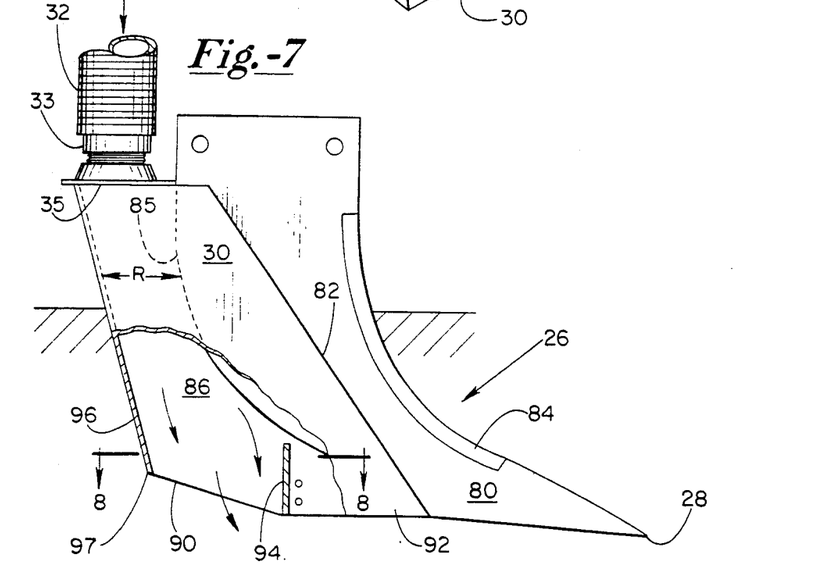
FIG. 7 is a partially sectioned elevation view 7—7 shown in FIG. 6 of the shank and passageway illustrating the integral passageway extending downwardly from the delivery tube to behind the tip of the shank.

Referring to FIG. 7, a partial sectional elevation view of earth working member 26 is shown. FIG. 7 illustrates first part or shank 80 intersecting and welded to chute 30 to form an integral and rigid structure. Distribution chute 30 is welded to shank 80 about each side of shank 80 along the intersection identified as line 82. A rear arcuate edge of shank 80 identified at 85 extends into a passageway 86 defined by the outer housing of distribution chute 30 as shown. Shank 80 is substantially planar such that liquid manure communicating from distribution passageway 32 into passageway 86 and eventually dispensed therefrom is not significantly restricted by the portion of shank 80 extending therein. Leading edge 82 of distribution chute 30 extends at an angle downwardly about a mid-section of each side of shank 80 as shown to provide a structurally rigid integral member. Shank 80 also includes a shank weldment 84 which is selectively secured to a forward edge of shank 80. Various weldments 84, such as weldments adapted to grasslands, clay or the like can be suitably attached to shank 80, depending on the field to be treated.

Passageway 86 defined in distribution chute 30 extends from an uppermost port 35 where it communicates with distribution line 32, downwardly to a product output opening having a first opening portion 90 and a second opening portion 92. The rims of openings 90 and 92 together form a single opening but the rims are at an obtuse angle with respect to one another. Opening portion 92 opens immediately downward behind shank 80, wherein opening portion 92 opens downward at an acute angle with respect to opening 90 and a horizontal reference established by the bottom of shank 80. Since opening 90 is angled downwardly and rearwardly, liquid manure can be dispensed from passageway 86 downwardly and rearwardly behind distribution chute 30 as shown by the flow direction arrows.

Also shown is a diverter bar 94 which extends laterally across the passageway 86 between sidewalls of distribution chute 30. Diverter bar 94 serves to direct and deflect most of the liquid manure downward and rearward through opening 90 behind distribution chute 30 as it is traversed through the created furrow. Thus, liquid manure will be projected rearwardly to assure an adequate rate of liquid manure can be dispensed from passageway 86. It is also important to note that loose soil will not become lodged in opening 90 due to the rearward discharge of manure as member 26 is advanced through the soil.

A rear plate 96 and 108 of distribution chute 30 each terminate at a distal end 97 which is defined above the horizontal reference line established by opening 92 and the bottom surface of shank 80 as shown. Opening 90 has a substantially greater opening area than opening 92. Diverter bar 94 is rigidly secured at opposite ends to respective side walls of distribution chute 30 by welding or rivets. Diverter bar 94 comprises a rectangular and rigid plate comprised of steel or the like, and extends in a substantially vertical plane as shown. Bar 94 extends vertically into passageway 86 approximately 4 inches such that a majority of liquid manure is dispensed out first opening 90 as shown. Due to opening 90 being angled rearwardly, wherein bar 94 is disposed forward of opening 90 and between openings 90 and 92, soil, such as clay, cannot easily clog or obstruct flow of liquid manure being dispensed out port 90.

Port 35 of passageway 86, as shown in FIG. 7, is wider than the diameter of distribution line 3 to prevent blockage. The diameter of passageway 86 is tapered and increases in the downward direction with the widest diameter located at a lower portion thereof, defined by openings 90 and 92. Passageway 86 has a generally trapezoidal profile as shown in FIG. 7. This facilitates liquid manure to be easily dispensed and reduces the chance of blockage. The distance "R" are defined by the rear edge of shank 80 and the rear plate 96 of distribution chute 30, as shown, is equal to or slightly greater than the diameter of distribution line 32 to ensure larger clumps of liquid manure do not become wedged therebetween such that blockage is minimized.

Figure 8:
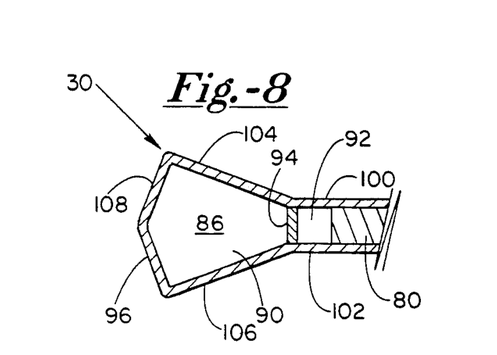
FIG. 8 is a sectional view 8—8 illustrated in FIG. 7 illustrating the cross-sectional wedge-shape of the delivery chute which is integral to the shank.

Referring to FIG. 8, a sectional top view 8—8 shown in FIG. 7 is shown illustrating the shape of the periphery of distribution chute 30. As shown, shank 80 extends into passageway 86. Chute 30 has a pair of outer opening surfaces 100 and 102, and a pair of outer surfaces 104 and 106 which angle outwardly at an acute angle with respect to surfaces 100 and 102. Together, shank 80 and chute 30 form a continuous wedge-like outer surface of earth working member 26 to facilitate creating a furrow in the soil as earth working member 26 is traversed through the soil by tractor 10. Distribution chute 30 as a pair of rear surfaces 96 and 108 which taper rearwardly and intersect one another such that surfaces 96, 104, 106, and 108 together to define the large passageway 86, wherein passageway 86 is substantially large in size to prevent blockage of liquid manure. This design of chute 30 also provides structural rigidity and integrity such that it does not attempt to collapse due to the force from adjacent soil as it is advanced in the soil to create a furrow. The walls of distribution chute 30 are preferably comprised of ⅛ inch steel to ensure structural integrity. However, limitation to these materials or dimensions is not to be inferred. Shank 80 preferably comprises iron or other rigid alloys.

Again referring to FIG. 7, in use. working member 26 is advanced downward by bar 22 to penetrate the soil while tractor 10 is advanced across the field. When tip 28 is advanced into the soil, the lower portion of earth working member 26 creates a furrow wherein output ports 90 and 92 are approximately 8-12 inches below grade, as shown.

One of the primary features of the present earth working member 26 is that distribution chute 30 is integral to shank 80 to form a rigid member. Further, distribution chute 30 has a uniquely shaped perimeter which is continuous with shank 80 to form a wedge to direct the soil outward. Further yet, chute 30 defines a large passageway to dispense liquid manure into the furrow at a sufficient rate and while minimizing blockage. Soil is not subject to blocking output port 92 since the rim of opening 92 angles rearward and upward, and because the outer walls 104 and 106 of distribution chute 30 are an extension of shank 80 as shown in FIG. 8. Thus, dispenser chute 30 is much more than simply an output port for dispensing liquid manure. It provides for an adequate flow of liquid manure without blockage, and also serves to create the furrow wherein soil adjacent to sides of dispenser chute 30 does not collapse into the furrow before liquid manure is dispensed. Distribution head 20 and each of identical earth working members 26, in combination, ensure a uniform quantity of manure is distributed into each furrow. The wedge-shaped outer walls 104 and 106 of distribution chute 30 ensure soil is urged outward from the furrow proximate openings 90 and 92. The predetermined angle that walls 104 and 106 extend from walls 100 and 103 can be selected to achieve a large or small soil disturbance.

Figure 9:
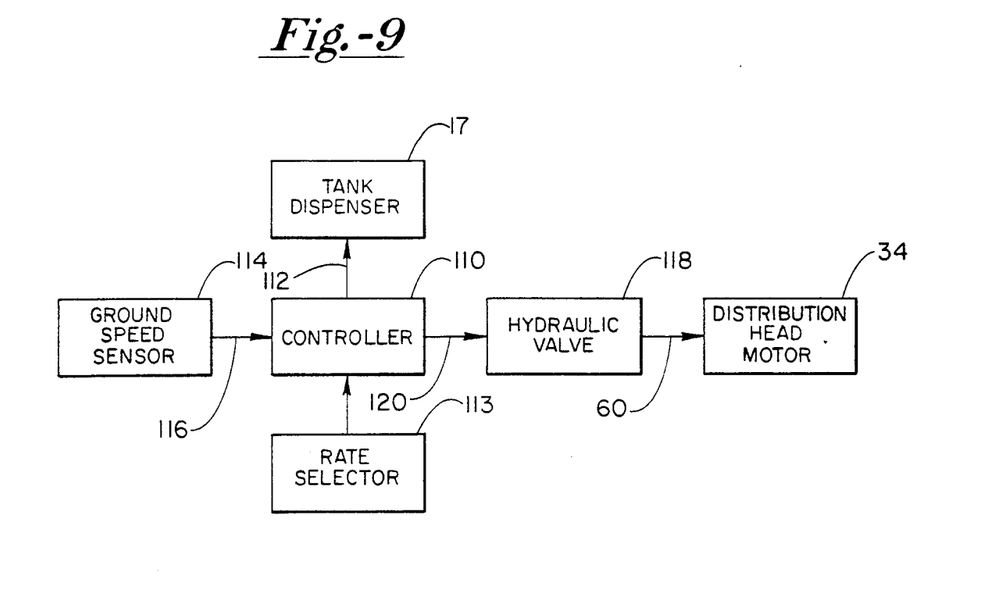
FIG. 9 is a functional block diagram of a fixed rate dispensing system incorporating the distribution head.

Now referring to FIG. 9, a block diagram of an electronic fixed displacement system is illustrated. An electronic microprocessor based controller 110 is located in the cab of vehicle 10 and controls the rate liquid manure is dispensed by dispenser 17 via line 112 as a function of selector 113, which is adjusted by the operator. A ground speed sensor 114, such as a radar based sensor, is adapted to vehicle 10 and provides an electronic signal directly proportional to and indicative of the sensed ground speed of vehicle 10 on line 116 to controller 110. Controller 110 can be programmed by the operator via selector 113 to dispense a predetermined quantity of liquid manure per a predetermined unit area. Controller 110 automatically and responsively controls the rate at which dispenser 17 dispenses liquid manure by adjusting the rotational speed of the pump or auger, as the case may be, such that the dispensing rate is directly proportional to the sensed ground speed provided by sensor 114. For instance, if the speed of vehicle 114 is doubled, as sensed by sensor 114, controller 110 ensures the rate at which dispenser 17 dispenses liquid manure from tank 12 is doubled. Hence, there is a linear relationship. This relieves the operator of the task of maintaining a particular speed when the dispenser is at a fixed setting to obtain a uniform spread of manure. Controller 110 also independently controls the speed of motor 34 in response to selector 113 as well by responsively controlling a selectable hydraulic valve 118 via line 120. Valve 118 regulates the flow of hydraulic fluid from vehicle 10 to motor 34 via lines 60 to control the rotational speed of motor 34.

The combination of the unique distribution head 20 discussed in reference to FIGS. 1-5 along with the novel soil working member 26 including the integral shank 80 and distribution chute 30, together, are uniquely adapted to overcome the common problems of distributing liquid manure which has an slurry-like consistency. Distribution head 20 breaks up larger clumps of liquid manure prior to being presented to the dispensing unit to reduce blockage, and soil working member 26 further reduces the chance of blockage while dispensing liquid manure below grade in the furrow.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A liquid manure distribution apparatus connected to a spreader vehicle having a storage tank for storing liquid manure, said apparatus having a distribution head comprising:
  (a) a housing having an outer wall defining a chamber therewithin, said housing having an input opening fluidly connected to the storage tank and a plurality of output ports;
  (b) an impeller journaled for rotation in said chamber, said impeller having a central hub and a plurality of vanes extending radially outward therefrom to within a predetermined distance from said outer wall of said housing and forming a predetermined spacing "D" of approximately ¼ inches therebetween, a predetermined spacing "W" between an upper edge of each of said vanes and an upper wall of said housing, and a predetermined spacing "L" between the central hub and the input opening of said housing, wherein "L" is at least equal to "W" which in turn is at least equal to "D", such that the liquid manure is progressively broken apart as it passes from said input opening to said plurality of output ports;
  (c) driving means coupled to said impeller for rotating said impeller; and
  (d) a plurality of conduits each having a distal end and coupled to one of said ports of said housing, said conduits each extending from said ports to said distal ends thereof.

2. The distribution apparatus specified in claim 1 wherein said impeller has a drive shaft and said vanes each have a distal end disposed opposite said shaft, wherein said vanes and are comprised of a substantially planar member lying in a plane substantially parallel to said shaft.

3. The distribution apparatus specified in claim 2 wherein said ports are defined in said housing outer wall proximate said distal ends of said vanes.

4. The distribution apparatus specified in claim 3 wherein the number of vanes is equal to the number of ports.

5. The distribution apparatus specified in claim 3 wherein said ports are equilaterally spaced from one another.

6. The distribution apparatus specified in claim 2 wherein said shaft is centrally located with respect to said housing and said vanes each have a substantially identical length.

7. The distribution apparatus specified in claim 1 wherein said input opening defined in said housing is located proximate said hub of said impeller.

8. The distribution apparatus specified in claim 1 wherein reach said conduits are comprised of flexible tubing.

9. The distribution apparatus specified in claim 1 wherein said conduits each have a substantially identical diameter, and wherein said ports each have a substantially identical diameter.

10. The distribution apparatus specified in claim 1 wherein said driving means comprises a hydraulic motor.

11. The distribution apparatus specified in claim 1 further comprising:
  (a) means for sensing ground speed of the spreader vehicle and providing a ground speed signal indicative thereof;
  (b) dispensing means for dispensing the liquid manure from the spreader vehicle tank at a selectable dispensing rate; and
  (c) control means for controlling the dispensing rate of said dispensing means as a function of said ground speed signal.

12. The distribution apparatus as specified in claim 1 wherein said spacing "W" is approximately ½ inch.

13. The distribution apparatus as specified in claim 1 wherein said housing input opening is defined by a rim, wherein said rim defines said spacing "L" between the rim and the impeller hub, "L" being less than a width of said housing output ports.

14. An integral low blade and dispensing unit comprised of a unitary rigid member having an upper portion and a lower portion including a tip adapted to penetrate soil, said member having a front edge and a rear surface each extending upwardly from said lower portion, said member further having an integral passageway defined therein extending from a member inlet located above said tip of said member to a member outlet opening downwardly proximate said lower portion of said member behind said tip of said member, wherein said member outlet is defined by a rim having a first rim portion which lies in a plane extending at an acute angle rearwardly and upwardly from said lower portion of said member, and wherein said passageway is wider proximate said member outlet than proximate said member inlet, increasing in width from said member inlet to said member outlet to reduce the chance of blockage thereof.

15. The distribution apparatus as specified in claim 14 wherein the member is defined by a delivery chute defining said passageway and fixedly secured to a rear portion of a rigid earth working member wherein the combination of said delivery chute and said rigid earth working member has a wedge shape.

16. An integral plow blade and dispensing unit comprised of a unitary rigid member having an upper portion and a lower portion including a tip adapted to penetrate soil, said member having a front edge and a rear surface each extending upwardly from said lower portion, said member further having an integral passageway defined therein extending from a member inlet located above said tip of said member to a member outlet opening downwardly proximate said lower portion of said member behind said tip of said member, wherein said member outlet is defined by a rim having a first rim portion which lies in a plane extending at an acute angle rearwardly and upwardly from said lower portion of said member, wherein said passageway is wider proximate said rear surface than proximate said front edge of said member.

17. An integral plow blade and dispensing unit comprised of a unitary rigid member having an upper portion and a lower portion including a tip adapted to penetrate soil, said member having a front edge and a rear surface each extending upwardly from said lower portion, said member further having an integral passageway defined therein extending from a member inlet located above said tip of said member to a member outlet opening downwardly proximate said lower portion of said member behind said tip of said member, wherein said member outlet is defined by a rim having a first rim portion which lies in a plane extending at an acute angle rearwardly and upwardly from said lower portion of said member, and further including a diverter plate fixedly coupled to said member in said passageway and extending upwardly from said lower portion of said member, wherein said diverter plate extends traversely across said passageway and is disposed forward of said first rim portion.

18. The distribution apparatus specified in claim 17 wherein said rim defining said member outlet further includes a second rim portion located forward of said diverter plate and which lies in a plane extending in a generally horizontal direction.

* * * * *

UNITED STATES PATENT AND TRADEMARK OFFICE
CERTIFICATE OF CORRECTION

PATENT NO. : 5,271,567
DATED : December 21, 1993
INVENTOR(S) : Norman A. Bauer

It is certified that error appears in the above-indentified patent and that said Letters Patent is hereby corrected as shown below:

Column 11, line 30, "and are" should read -- are each --.
Line 49, "reach" should read -- each --.

Column 12, line 8, "low blade" should read -- plow blade --.

Signed and Sealed this

Twelfth Day of July, 1994

Attest:

BRUCE LEHMAN

*Attesting Officer*   *Commissioner of Patents and Trademarks*